United States Patent [19]

Dalboussiere et al.

[11] 4,296,463
[45] Oct. 20, 1981

[54] SELECT SYSTEM FOR PRIORITY INTERFACE CIRCUITRY

[75] Inventors: Gerard Dalboussiere, La Colle, Loup, France; Wilburn D. Draper, Raleigh, N.C.

[73] Assignee: International Business Machines Corp., Armonk, N.Y.

[21] Appl. No.: 39,714

[22] Filed: May 17, 1979

[30] Foreign Application Priority Data

Jun. 7, 1978 [FR] France .................. 78 17709

[51] Int. Cl.³ .............................................. G06F 3/04
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,967,246 | 6/1976 | House | 364/200 |
| 3,983,540 | 9/1976 | Keller et al. | 364/200 |
| 3,996,561 | 12/1976 | Kowal et al. | 364/200 |
| 4,159,518 | 6/1979 | Draper et al. | 364/200 |

Primary Examiner—Gareth D. Shaw
Assistant Examiner—Thomas M. Heckler
Attorney, Agent, or Firm—John B. Frisone

[57] ABSTRACT

A dynamic preselect interrupt priority circuit in which a plurality of adapters dynamically readjust priority until selected whereupon adjustment stops and the adapter having the highest interrupt and position priority is selected.

5 Claims, 4 Drawing Figures

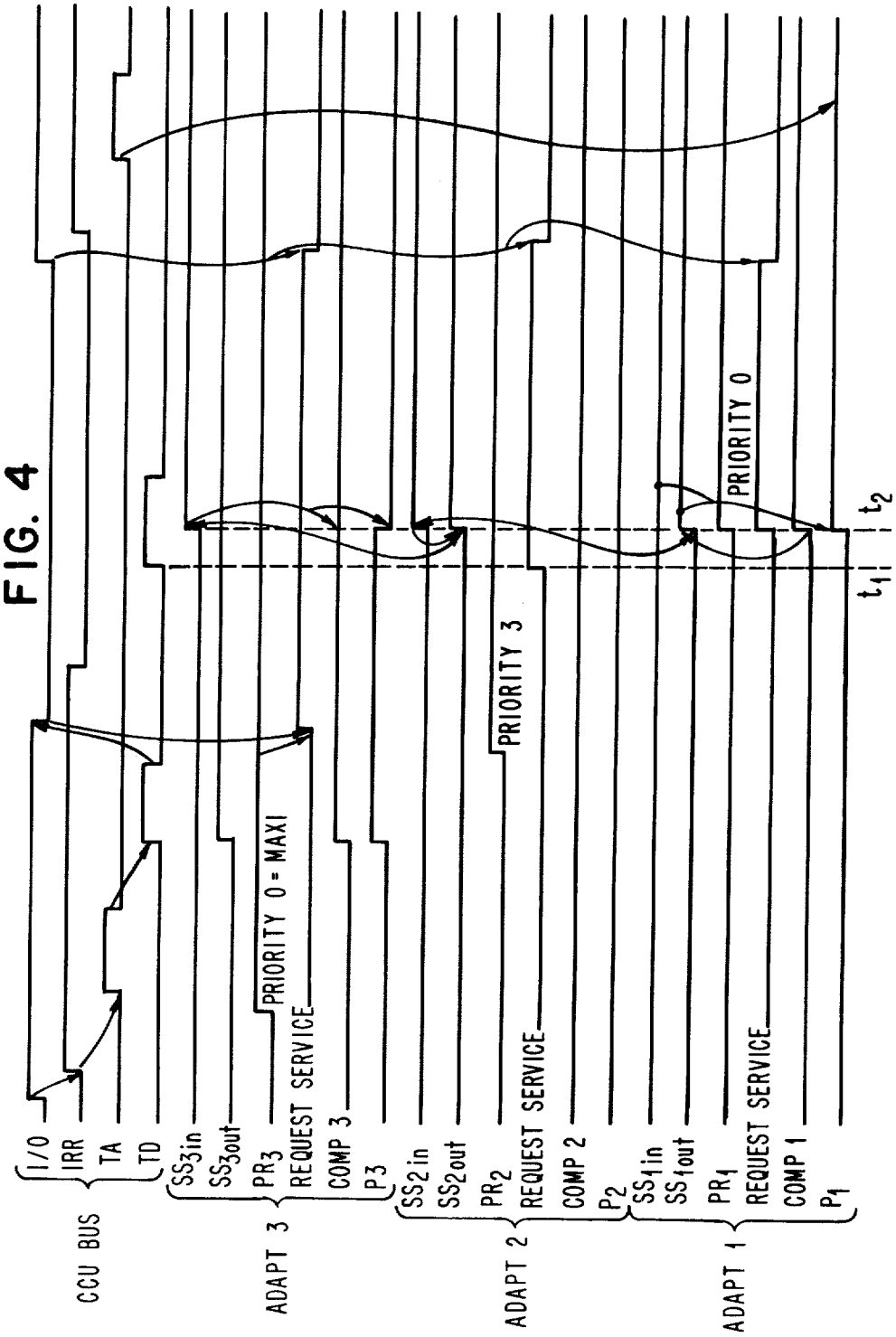

SELECT SYSTEM FOR PRIORITY INTERFACE CIRCUITRY

DESCRIPTION

FIELD OF THE INVENTION

This invention relates to an interface circuit select system based on priority considerations for use in communications controllers and the like. More specifically, it relates to processing means for processing data transfers through adapters according to priority levels of the adapters.

Modern communications controllers are intended to be incorporated into data teleprocessing systems so as to handle therein not only communications over the various lines which are connected thereto, but also to fulfill various teleprocessing functions. In many facilities, the main control of the teleprocessing network is contained in one or several central processing units (CPU's) having a list of the data processing rules for processing the data coming from or going to the terminals of the teleprocessing network. Both transmission and reception of the data through the transmission lines (physical lines or microwave links) are processed by communications controllers controlled by the CPU(s). In addition to the processing functions, the controller provides additional functions specified in the said list, more particularly those functions which are directly related to standard communications procedures. In this way, the CPU is relieved from those tasks and can devote itself to carrying out other operations.

Therefore, implementation of these functions in a communications controller requires a relatively complex and intelligent apparatus. Most of the intelligence is contained in one or several central control units (CCU). The CCU's are connected to the terminals by line adapters, and to the CPU(s) by channel adapters which are also connected to the multiplex channels of the CPU's. When an adapter needs to proceed to a transfer, it requires a service and waits for the CCU answer.

BACKGROUND OF THE INVENTION

All the tasks assigned to the adapters are not equally urgent and, therefore, these tasks are given priority levels. Handling of the adapters is relatively simple when each of them is given tasks having the same level of priority. It then suffices to determine the identities of those adapters which require service to know which of them must be serviced first.

It is, however, not always possible to proceed this way since the demands of the teleprocessing system architecture often require that tasks with different priority levels be assigned to a single adapter. The adapters then can be distributed into groups, and each group can be provided with an auto-selection system. Before requesting service or servicing an order coming from the CCU, the adapters in a single group proceed to execute a selection amongst them in order to determine which adapter will be activated. However, this auto-selection operation is not carried out instantaneously which entails a waste of time detrimental to the controller throughput.

OBJECTS OF THE INVENTION

One object of this invention is to provide for selecting the adapter to be serviced first from a group of adapters linked to a communications controller within a minimum time period.

Though the following description will deal essentially with adapters and communications controllers, this invention applies to any interface device and circuit assembly for interfacing units requiring services with different priority levels and a central unit.

Another object of this invention is to provide for processing the services requested by interface devices linked to the central unit in conformity with the priority levels of these service requests and as quickly as possible.

This invention will be further explained, by way of example, with reference to the accompanying drawings, in which:

DESCRIPTION OF THE FIGURES

FIG. 4 is a timing diagram of the select operations according to this invention.

SUMMARY OF THE INVENTION

Figure 1:
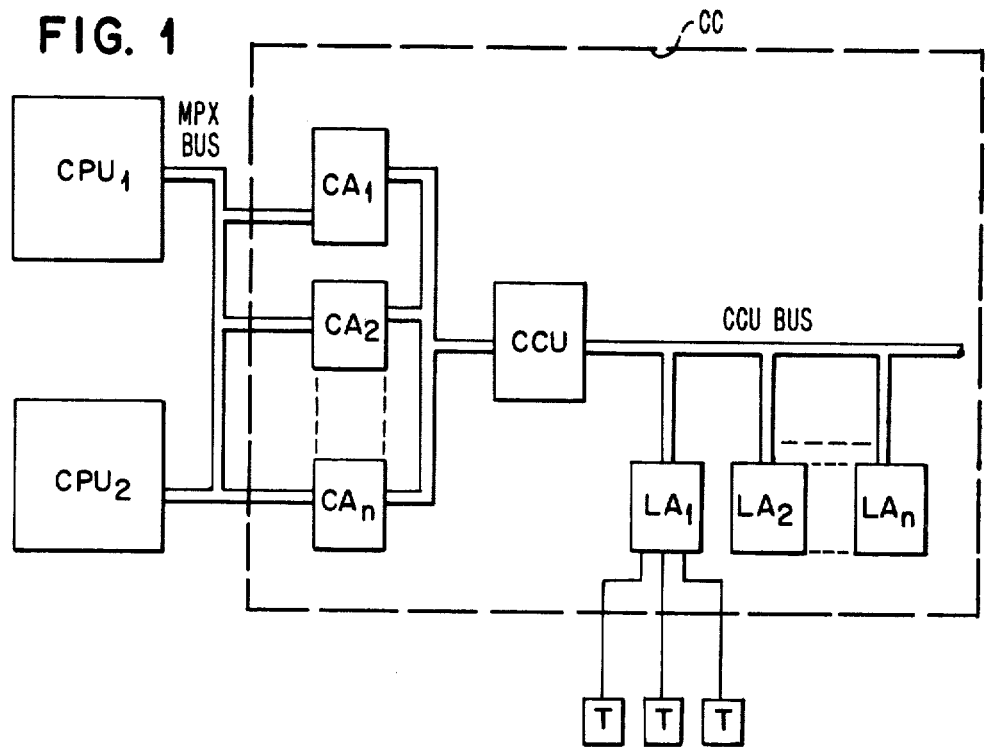
FIG. 1 is a general block diagram of a teleprocessing system architecture including a communications controller in which the present invention may be used.

FIG. 1 is a schematic diagram of the architecture of a communications controller (CC) in a teleprocessing system. The intelligent element of the communications controller, namely, its central control unit (CCU), processes the data in transit between terminals T and central processing units CPU 1 and CPU 2. While operating, the CCU applies well-defined communications procedures and protocols. It is connected to multiplex channels (MPX BUS) of units CPU 1 and CPU 2, through channel adapters CA1, CA2, . . . , CAn. It is also connected to terminals T, through line adapters LA1, LA2, . . . , LAn, connected to a so-called CCU BUS. These adapters are distributed into groups, here, two in numbers, one group being comprised of the CA adapters, the other one being comprised of the LA adapters. The adapters of a group must be able to apparently operate concurrently. Now each of them is connected to devices which they have to service which requires that a number of different priority tasks be assigned to each adapter. Any adapter that wishes to communicate with the CCU unit applies for a service request. The CCU, however, cannot answer favorably all these requests at any time. When it is ready to deal with these requests, it notifies the adapters of it by initiating an Input order. All the adapters in a group then must respond so as to comply with the priority rules. To this end, an inquiry mechanism is provided which examines the priority services among the adapters of a group; and when permitted by the CCU, this mechanism initiates the selection process for selecting that adapter which will operate first according to the established priority rules. Such a selection system is slow in view of the time required to hold this inquiry.

This invention remedies these drawbacks whatever be the type of the involved interface device, whether it be channel adapters or line adapters. However, in order to make the description clearer, there will be considered the case of a group of n line adapters belonging to a communications controller.

This invention includes pre-selection means owing to which the internal service request status, i.e., the status of the service requests pending in the adapters of the group is updated in an asynchronous manner and referred to when it is about to select from amongst those adapters the one which will be serviced first as soon as the CCU permits selection.

With those means, it will be possible to bring the synchronous selection phase to a very simple operation.

DESCRIPTION OF A PREFERRED EMBODIMENT

Figure 2:
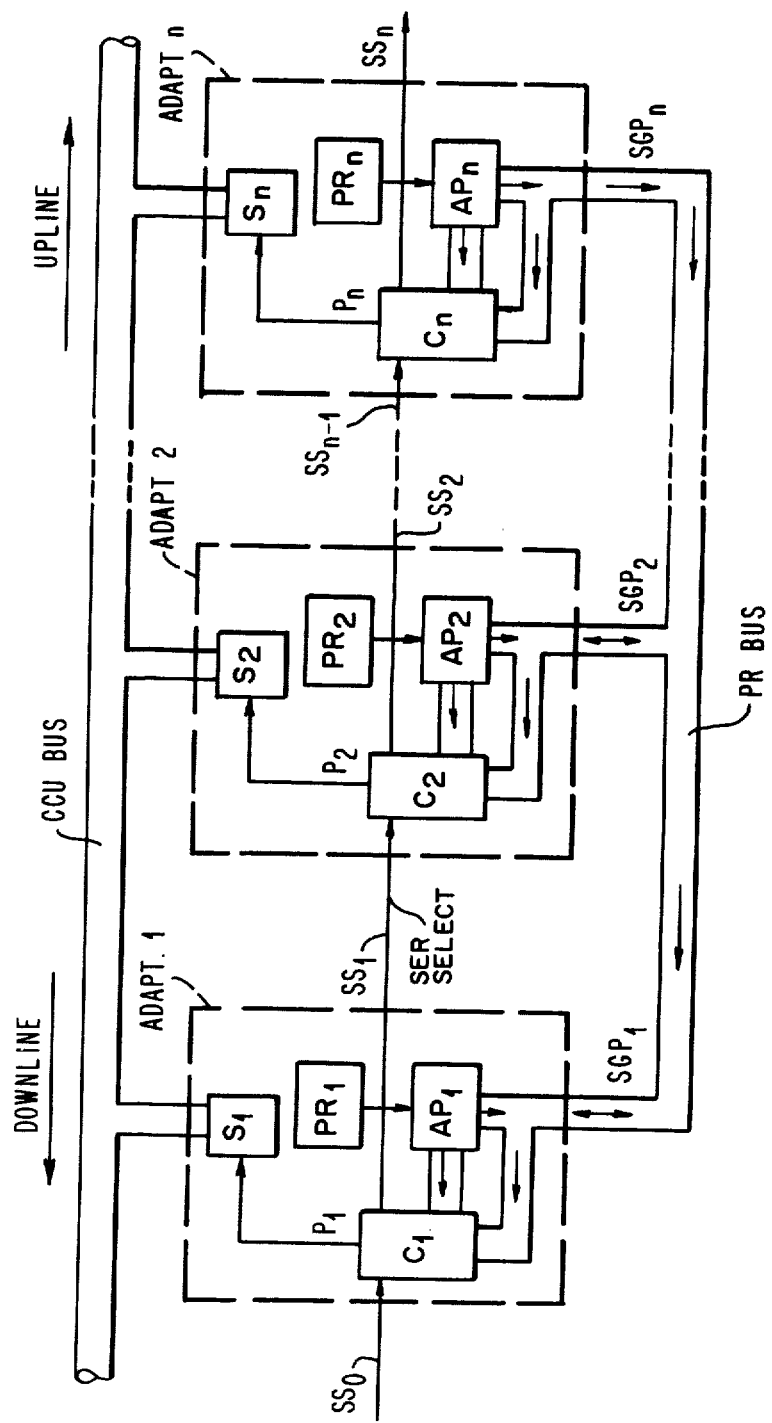
FIG. 2 is a schematic block diagram of a priority mechanism constructed according to the invention.

FIG. 2 is a schematic diagram illustrating the principle of operation of the invention. The adapters, referred to as ADAPT 1 through ADAPT n, are connected to the CCU BUS through select latches S1, S2, . . . , Sn. Each adapter, in addition, contains a priority request register PR1, PR2, . . . , PRn, an adapter priority register AP1, AP2, . . . , APn, and a comparison device C1, C2, . . . , Cn. The adapters are connected to one another by a priority bus referred to as PR BUS and by a number of serial select lines SER SELECT. The priority bus consists of one line for each priority level exclusive of the lowest priority to be serviced by the concerned group. When none of the lines of the PR BUS is activated, the pending service request(s) is considered as being at the lowest level. The PR BUS can be a bi-directional or a unidirectional bus. This bus presents each adapter with an expression of the OR logic function of the priorities of the service requests pending in all adapters of the group that are up line the concerned one.

During operation, when considering the $i^{th}$ adapter ADAPT$_i$, the contents of PR$_i$ is frequently updated in order to reflect the highest priority request among those pending in that adapter. The contents can be modified several times between two consecutive select times. It is transferred into register AP$_i$ under the control of transfer signal TD which prevents modification of the contents AP$_i$ while the CCU is selecting the adapter. An OR logic function is carried out between AP$_i$ (more specifically, the contents of AP$_i$) and the contents of PR BUS seen by the adapter, so as to generate a so-called serial group priority (SGP$_i$) logic function. When the priority bus is unidirectional, the information SGP$_i$ is seen by all the adapters of the group that are down line with respect to the considered adapter. Therefore, $SGP_i = AP_i + SGP_{i+1}$, then AP$_i$ is compared with SGP$_i$ in C$_i$ in order to determine whether the corresponding adapter is eligible for pre-selection.

Such is the case when AP$_i$=SGP$_i$, i.e., when the request priority given by the contents of AP$_i$ is equal to the highest priority given by the contents of SGP$_i$. When designating the logic levels of SER SELECT obtained at the output and at the input of an adapter, by SSout and SSin, respectively, there will be obtained SS$_i$out = 1 if SS$_i$in = 1 or if AP$_i$=SGP$_i$ for that adapter.

The logic level status of SER SELECT can be changed asynchronously. It is taken into consideration only when the conditions which cause PR$_i$ to be transferred into AP$_i$ disappear and when the status of SGP$_i$'s is settled. When this occurs, the pre-selection mechanism stops operating and signals SS$_i$ are settled. An adapter, then, is pre-selected upon mere logic operation: The said adapter is the one for which the AND logic function carried out between SS$_i$out and the inverse of SS$_i$ in, supplies a logic level 1. This condition will be satisfied for one, and only one, adapter within a group.

The select operation then is a very simple one. When the control unit CCU sends a select order (ORD SEL) on the CCU BUS, only that adapter eligible for pre-selection (P$_i$=1) responds to this order, supplies its identity to the CCU, and sets its latch S$_i$ to logic level "1". The other adapters reset their latches to logic levels "0".

In addition to the case when the adapters recognize which one of them will be serviced first, there are other cases when this recognition operation is not controlled by the adapters. Such is the case when the selection is programmed (SEL PROG), for instance. Then the CCU provides the address of that adapter to be connected to CCU BUS in the form of select data (D SEL) preceded with a signal denoting a programmed selection. All the adapters recognize this signal and decode the next following select data. The adapter which is recognized, i.e., D.SEL is identical with its own identification data IDENT., sets its latch S, and the other adapters reset their latches.

Once the selection is made, whether it be programmed or obtained after the pre-select procedure, all the input/output data addressed to the group of adapters, are recognized only by the adapter having its select latch S, set.

The operation of the select devices, therefore, complies with the following logic relations (logic AND and OR's are represented by a point (·) and a +, respectively).

(1) S Select latch:
$S_{set}$=(ORD.SEL)·P+[SEL PROG.(DSEL=IDENT)]
$S_{reset}$=(ORD.SEL)·$\bar{P}$+[SEL PROG.(DSEL≠IDENT)]

(2) P Pre-select condition:
$P_i$=(SERV RQ)·SS$_i$·$\overline{SS}_{i-1}$ (3) PR Priority request (Register)
Asynchronously updated according to needs.

(4) AP Priority adapter (Register)
AP$_i$=PR$_i$·TD (5) SGP Serial group priority:

$SGP_1 = AP_1 + AP_2 + \ldots + AP_i + \ldots + AP_n$
$SGP_2 = \phantom{AP_1 + } AP_2 + \ldots + AP_i + \ldots + AP_n$ $SGP_i = \phantom{AP_1 + AP_2 + \ldots + } AP_i + \ldots + AP_n = \sum_{j=i}^{n} AP_j$ $SGP_n = \phantom{AP_1 + AP_2 + \ldots + AP_i + \ldots + } AP_n$ (6) SS Serial select:
SS$_i$=SS$_{i-1}$+[SERV RQ·(AP$_i$=SGP$_i$)]
SS$_0$=0

The expression AP$_i$=SGP$_i$ means that the priority level identified by AP$_i$ is equal to the highest priority level contained in SGP$_i$, i.e., concerning the adapters of ranks i through n (namely, the adapter upline i plus the adapters of rank i).

The pre-select conditions for pre-selecting an adapter of rank i can, therefore, be summarized as follows:

$SS_i = SS_{i-1} + (AP_i = SGP_i)$

-continued $$P_i = SS_i \cdot \overline{SS_{i-1}} = [SS_{i-1} + (AP_i = SGP_i)] \cdot \overline{SS_{i-1}}$$
$$= \overline{SS_{i-1}} + (AP_i = SGP_i).$$

Therefore, it can be observed that the system eliminates any conflict between adapters. Indeed, as soon as the most down line adapter has been selected from amongst the adapters requiring service, the other adapters receive a logic level "1" on their inputs SER SELECT and their pre-select condition P is automatically brought to "0".

Figure 3A:
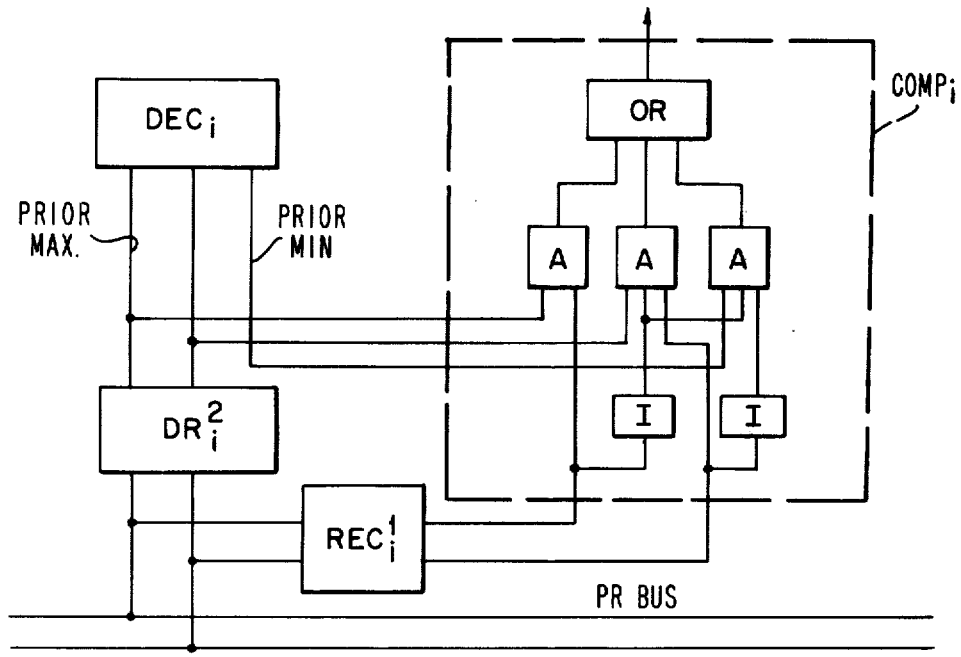
FIGS. 3 and 3A are detailed block diagrams of interfacing circuitry implemented in one of the interface devices according to this invention.
Figure 3:
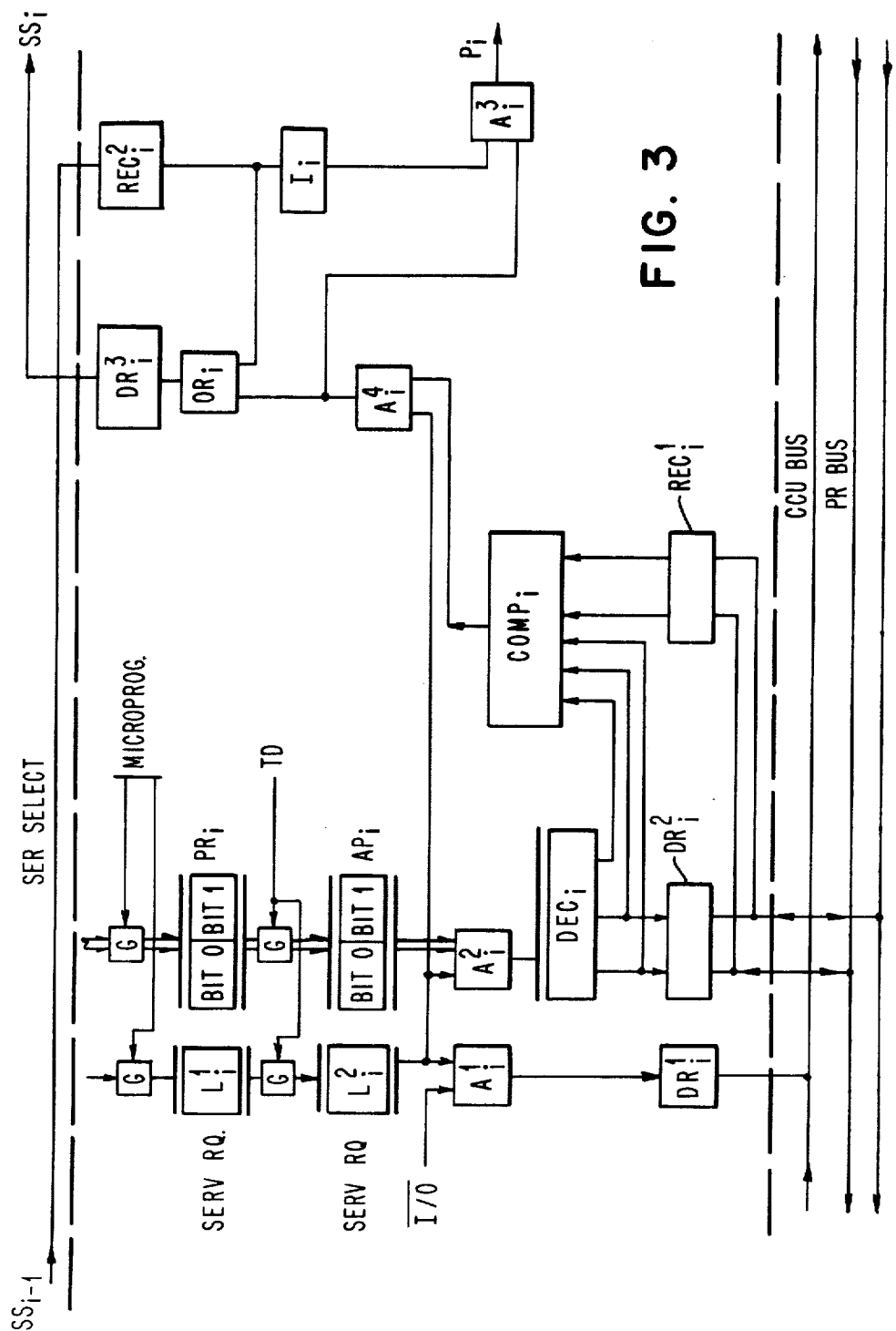

FIG. 3 shows a detailed embodiment of the pre-select device for the $i^{th}$ adapter within a group. A device, not shown in the figure, determines the highest priority level from among the pending requests of the units serviced by this adapter. This highest priority level is gated into $PR_i$. Since here the total number of the priority levels of the system has been set to three, the registers of the PR and AP types have two bit positions. $PR_i$ is loaded while a latch $L_i^1$ is set in an asynchronous manner with respect to CCU, and this, under a microprogram control (not shown) which, in addition, controls other operations of the adapter. Latch $L_1^1$ simply indicates the presence of a service request SERV RQ. When TD=1, the contents of $L_i^1$ are transferred into latch $L_i^2$, the so-called adapter service request latch, whereas the contents of $PR_i$ are transferred into $AP_i$. It should be noted that this preferred embodiment takes advantage of the fact that there is a signal which belongs to the conventional exchange procedure on the CCU BUS between CCU and LA for this signal to produce TD. In that case, then, TD is supplied by the CCU, which eliminates the need for another clock and to simplify the operations needed to prevent modification of the contents of $AP_i$ during the select operation. When the logic level of a so-called input/output control line of the CCU BUS assumes logic level "0" ($\overline{I/O}=1$), the adapter service request is presented to the CCU through the opening of "and" gate $A_i^1$. The voltage level necessary to drive the CCU BUS is supplied by circuit $DR_i^1$. The adapter service request ($L_i^2=1$) also controls the opening of "and" gate $A_i^2$ which transmits the contents of $AP_i$ into decoder $DEC_i$. The output of $DEC_i$ is comprised of three outputs, one for each possible priority level. These outputs, exclusive of the output which is assigned to the lowest priority, are connected to PR BUS through a driver $DR_i^2$. A dot OR logic function is provided at the output of $DR_i^2$ between the contents of PR BUS at the $i^{th}$ adapter level and the output of $DR_i^2$. A receiver $REC_i^1$ reshapes or amplifies and/or limits the electrical signals resulting from said dot OR function. The output of $REC_i^1$ is compared (by $COMP_i$) with the information coming from $DEC_i$. The output of $COMP_i$ is brought to logic level "1" when the output of $DEC_i$ denotes an adapter i internal service request, the priority level of which is equal to the highest priority which appears at the output of $REC_i^1$. In other words, $COMP_i=1$ when $AP_i=SGP_i$.

Receiver $REC_i^2$ reshapes the logic information $SS_{i-1}$ (i.e., $SS_i$(in) for the adapter under consideration) coming from the serial select line SER SELECT. The inverter $I_i$ provides $\overline{SS_{i-1}}$ which is transmitted to one of the two inputs of a two-input "and" gate $A_i^3$. The second input of this gate receives the output of $COMP_i$ through "and" gate $A_i^4$ which is opened under the control of the output of $L_i^2$. The output of $A_i^3$, therefore, supplies the logic information $P_i$. Circuit $OR_i$ fulfills logic function OR on the outputs of $REC_i^2$ and $A_i^4$. The output of $OR_i$, reshaped by circuit $DR_i^3$, supplies information $SS_i$ (i.e., $SS_{out}$ for the adapter under consideration), to line SER SELECT. This information is transmitted upline, i.e., to adapter of rank (i+1).

Since $SS_0=0$ and since $P_i$ cannot be changed to "1" unless $SS_{i-1}=0$, any conflicting situation resulting from simultaneous service requests formulated on the same priority level from different adapters of the same group is automatically resolved. The most downline adapter is serviced first.

FIG. 3A is a detailed embodiment of $COMP_i$. This circuit is comprised of two inverters (I), three AND circuits designated by A and one OR circuit. The outputs assigned to the highest and lowest priority levels have been designated by Prior.Max and Prior.Min, respectively.

The time diagram of FIG. 4 helps to better understand the various operations leading to the selection of an adapter.

The first four lines of the diagram concern the CCU BUS. More specifically, they are indicative of the logic states of four control lines of this bus.

The first line is designated by I/O. Its logic state is program-controlled. When the CCU is available for a so-called input/output operation, line I/O assumes logic level "1". As seen before, an adapter can require service of the CCU only when I/O=0.

Immediately after I/O raises at logic level 1, the program causes line IRR to assume state "1". The adapters stop requesting services to the CCU on the CCU BUS.

A third line TA assumes state "1" and the CCU applies a word which is recognized by the adapters as a SELECTION order, upon part of the CCU BUS intended for the data, which selection order corresponds to the above-mentioned OR.SEL.

The fourth line is indicative of the variations in signal TD.

The following lines shown in the diagram concern a group containing three adapters. They are used to illustrate, through examples, the operating process of this invention with respect to time.

It has first been assumed that only adapter 3 was requiring service at priority level, i.e., at the highest priority level. PR3 is indicative of an internal service request at this priority level. When TD assumes logic level "1", the contents of PR3 are gated into AP3. Since AP3=SGP3, the output of COMP3 assumes state "1". Besides, $\overline{SS_2}=1$, wherefrom P3=1. As soon as $\overline{I/O}=1$, adapter 3 formulates its service request to the CCU by causing one line of the CCU BUS reserved for that purpose to raise to 1. But before TA rises to "1", which permits the selection of adapter 3, other service requests appear and the situation is updated owing to the pre-selection mechanism. Indeed, the units serviced by adapter 2 are requiring services the highest priority level of which is 3 (the lowest possible level in the priority levels of the grouper of adapters). When TD rises to "1" at time $t_1$, PR2 is gated into AP2. The pre-selection cycle is started anew. Since ADAPT 1 is not requiring service, the logic level of SER SELECT is "0" at the output of this adapter and at the input of ADAPT 2. But the line indicating that ADAPT 2 is requiring service assumes logic level "1". Since ADAPT 2 is requiring service at a lower priority level than adapter 3, AP2<SGP2, the outputs of COMP 2 and P2 remain at logic level "0". Therefore, there is no change for ADAPT 3 until time $t_2$ when ADAPT 1 is requiring service. This service request is at the highest priority level (reference zero). As a rule, there would be a conflict as to whether ADAPT 1 or ADAPT 3 is eligible for preselection first. Since TD is still at logic level "1", at time $t_2$, the contents of PR1 are gated into AP1. At that moment, AP1=SGP1, the output of COMP1=1. In view of this, the logic level of SER SELECT at the output of ADAPT 1 assumes the level "1" and P1=1.

But, according to the logic equation $$SS_i = SS_{i-1} + [\ldots],$$

as soon as logic level assumes "1" anywhere on line SER SELECT, this level is propagated upline at both the input and output of each adapter. This is illustrated on the diagram.

Likewise, since $P_i = SS_i \cdot \overline{SS_{i-1}}$, the logic value "1" propagated along line SER SELECT brings the outputs P upline ADAPT 1, back to logic level "0"; therefore, P2=P3=0. The fact that P3 is forced to assume logic level "0" solves the conflictual priority situation between adapter 1 and 3. Only P1=1 and, therefore, only latch S1=1.

When logic level I/O=1, the logic levels of the service request lines requiring of the CCU BUS are set to "0".

Finally, when TA=1 and when ORD.SEL appears on the data bus, a selection is ordered by the CCU. The selection cycle is brought to its simplest expression, i.e., a test of latches S.

In the chosen example, only S1=1, which means that ADAPT 1 is selected.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. A selection system for making the selection amongst interface circuits, each interface circuit interfacing a plurality of units making service requests at different priority levels, and a central unit, said selection being carried out according to said priorities, and said system being characterized in that it includes:

a central unit bus for connecting the interface circuits to the central unit, a priority bus having an upline and down line extent and carrying priority level information, a group of n interface circuits connected along said priority bus and each including a preselection means comprising:

a priority request register for registering the highest priority level received from the pending requests of the units connected to the interface circuit, an adapter priority register connected to said priority request register for receiving the contents of the said priority request register at a predetermined time, driving means connected to the priority bus for placing on the priority bus the priority level information from the adapter priority register, receiving means connected to the priority bus and to the driving means and providing on its output the priority level information corresponding to the service requests pending in the interface circuits upline of the said interface circuit, comparison means receiving on its first inputs the priority registered in the adapter priority register and on its second inputs the priority level provided by said receiving means and providing on its output a logic level "1" when the priority registered in the adapter priority register for that interface has a level higher than or equal to the priority level of the request having the highest priority among the requests pending in said interface circuits upline of the considered interface, a serial select line interconnecting the n interface circuits of the group through one input connection and one output connection provided at each interface circuit, means at each said interface circuit for propagating a serial selection informaion through the output connection of the serial select line, said means comprising an OR circuit having two inputs one receiving the logic level of the serial select line at the input connection and the other one receiving the logic level provided at the output of the comparison means and providing on its output the serial selection information to the output connection, a select latch for enabling connection of said interface circuit to said central unit bus, and logic means at each of the said interface circuits responsive to the results provided by the comparison means, the condition of the serial select line input and the presence of a select order from the central unit for setting the select latch of only one of the interface circuits and resetting the select latches of the other interface circuits whereby the said one interface circuit which has its select latch set is enabled for communication with the central unit over said central unit bus.

2. A selection system for selecting interface circuitry according to claim 1, characterized in that said priority bus is of the unidirectional type and is connected to each of said interface circuits by a bidirectional tap.

3. A selection system for selecting interface circuitry according to any one of claims 1, or 2, being further characterized in that the logic level of the serial select line at the input of the down most interface circuit, assumes logic level "zero".

4. A selection system for selecting interface circuitry according to claim 3, characterized in that it is associated with a communications controller wherein said interface circuits are line adapters.

5. A selection system for selecting interface circuitry according to claim 3, characterized in that it is associated with a communications controller wherein said interface circuits are channel adapters.

* * * * *